(12) United States Patent
Schwarz et al.

(10) Patent No.: US 8,386,756 B2
(45) Date of Patent: *Feb. 26, 2013

(54) EMULATING HEXADECIMAL FLOATING-POINT OPERATIONS IN NON-NATIVE SYSTEMS

(75) Inventors: Eric M. Schwarz, Gardiner, NY (US); Ronald M. Smith, Sr., Wappingers Falls, NY (US)

(73) Assignee: International Business Machines Corporation, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 13/083,760

(22) Filed: Apr. 11, 2011

(65) Prior Publication Data

US 2011/0185157 A1 Jul. 28, 2011

Related U.S. Application Data

(63) Continuation of application No. 12/363,825, filed on Feb. 2, 2009, now Pat. No. 7,949,858, which is a continuation of application No. 11/406,465, filed on Apr. 18, 2006, now Pat. No. 7,500,084, which is a continuation of application No. 10/435,982, filed on May 12, 2003, now Pat. No. 7,254,698.

(51) Int. Cl.
   *G06F 7/38* (2006.01)
(52) U.S. Cl. .................................................. 712/222
(58) Field of Classification Search .................. None
   See application file for complete search history.

(56) References Cited

U.S. PATENT DOCUMENTS

| 4,773,035 | A | 9/1988 | Lee et al. |
| 5,193,167 | A | 3/1993 | Sites |
| 5,490,100 | A | 2/1996 | Kableshkov |
| 5,687,106 | A | 11/1997 | Schwarz |
| 5,889,980 | A | 3/1999 | Smith |
| 6,112,019 | A | 8/2000 | Chamdani |
| 6,366,942 | B1 | 4/2002 | Badeau |
| 6,829,627 | B2 | 12/2004 | Krygowski |
| 7,010,677 | B2 | 3/2006 | Matsuo |
| 2007/0061392 | A1 | 3/2007 | Gerwig et al. |

OTHER PUBLICATIONS

Schwarz et al, "The S/390 G5 floating-point unit", IBM J. Res, Develop., vol. 43 No. 5/6, Sep./Nov. 1999, pp. 707-720.
Slegel et al, "IBM's S/390 G5 microprocessor design.", 1999 IEEE, pp. 12-23.
MC68030 User Manual, 1989 by Motorola, Inc., pp. 10-47 and 10-48.

*Primary Examiner* — Jacob A Petranek
(74) *Attorney, Agent, or Firm* — Jon A. Gibbons; Fleit Gibbons Gutman Bongini & Bianco PL

(57) ABSTRACT

A new zSeries floating-point unit has a fused multiply-add dataflow capable of supporting two architectures and fused MULTIPLY and ADD and Multiply and SUBTRACT in both RRF and RXF formats for the fused functions. Both binary and hexadecimal floating-point instructions are supported for a total of 6 formats. The floating-point unit is capable of performing a multiply-add instruction for hexadecimal or binary every cycle with a latency of 5 cycles. This supports two architectures with two internal formats with their own biases. This has eliminated format conversion cycles and has optimized the width of the dataflow. The unit is optimized for both hexadecimal and binary floating-point architecture supporting a multiply-add/subtract per cycle.

20 Claims, 8 Drawing Sheets

MNEMONIC1    R1, R3, R2         [RRF]

| OP CODE | R1 | //// | R3 | R2 |
|---|---|---|---|---|
| 0 | 16 | 20 | 24 | 28 31 |

FIG.1

| MNEMONIC1 | OP CODE | OPERANDS |
|---|---|---|
| MAER | 'B32E' | SHORT HFP |
| MADR | 'B33E' | LONG HFP |

MNEMONIC2    R1, R3, D2(X2, B2)    [RXF]

| OP CODE | R3 | X2 | B2 | D2 | R1 | //// | OP CODE |
|---|---|---|---|---|---|---|---|
| 0 | 8 | 12 | 16 | 20 | 32 | 36 | 40   47 |

FIG.2

| MNEMONIC2 | OP CODE | OPERANDS |
|---|---|---|
| MAE | 'ED2E' | SHORT HFP |
| MAD | 'ED3E' | LONG HFP |

MNEMONIC1    R1, R3, R2         [RRF]

| OP CODE | R1 | //// | R3 | R2 |
|---|---|---|---|---|
| 0 | 16 | 20 | 24 | 28 31 |

FIG.3

| MNEMONIC1 | OP CODE | OPERANDS |
|---|---|---|
| MSER | 'B32F' | SHORT HFP |
| MSDR | 'B33F' | LONG HFP |

MNEMONIC2    R1, R3, D2(X2, B2)    [RXF]

| OP CODE | R3 | X2 | B2 | D2 | R1 | //// | OP CODE |
|---|---|---|---|---|---|---|---|
| 0 | 8 | 12 | 16 | 20 | 32 | 36 | 40   47 |

FIG.4

| MNEMONIC2 | OP CODE | OPERANDS |
|---|---|---|
| MSE | 'ED2F' | SHORT HFP |
| MSD | 'ED3F' | LONG HFP |

Finalize and Store Final
Result           (806 906)

1001

```
Normalize and Round as
Appropriate Depending on
Format Operand
```

1002

```
Store Final Result
```

FIG. 10

EMULATING HEXADECIMAL FLOATING-POINT OPERATIONS IN NON-NATIVE SYSTEMS

CROSS-REFERENCE TO RELATED APPLICATION

This is a continuation of application Ser. No. 12/363,825 filed on Feb. 2, 2009, which was a continuation of application Ser. No. 11/406,465 filed on Apr. 18, 2006, now U.S. Pat. No. 7,500,084, which was a continuation of application Ser. No. 10/435,982 filed on May 12, 2003, now U.S. Pat. No. 7,254,698, all of which are assigned to IBM and the entire disclosures of which are each hereby incorporated by reference in their entirety.

FIELD OF THE INVENTION

This invention relates to computer system architecture and particularly to new instructions which augment the IBM z/Architecture and can be emulated by other architectures and these new fused hexadecimal floating point instructions MULTIPLY AND ADD and MULTIPLY AND SUBTRACT execute in a new floating point unit with RRF and RXF formats.

Trademarks: IBM® is a registered trademark of International Business Machines Corporation, Armonk, N.Y., U.S.A. S/390, 2900 and z990 and other product names may be registered trademarks or product names of International Business Machines Corporation or other companies.

BACKGROUND OF THE INVENTION

Before our invention IBM® has created through the work of many highly talented engineers beginning with machines known as the IBM System 360 in the 1960s to the present, a special architecture which, because of its essential nature to a computing system, became known as "the mainframe" whose principles of operation state the architecture of the machine by describing the instructions which may be executed upon the "mainframe" implementation of the instructions which had been invented by IBM inventors and adopted, because of their significant contribution to improving the state of the computing machine represented by "the mainframe", as significant contributions by inclusion in IBM's Principles of Operation as stated over the years. The First Edition of the z/Architecture® Principles of Operation which was published December, 2000 has become the standard published reference as SA22-7832-00. The first machine to implement both binary floating point BFP and hexadecimal floating point HFP architectures in hardware providing a floating point unit was the 1998 IBM S/390 G5 Processor.

A hexadecimal dataflow is used which requires binary operands to be converted to hexadecimal operands before they are operated on. The HFP instructions are capable of performing one add or one multiply per cycle with a latency of about 3 cycles. The BFP instructions can only be pipelined one instruction every other cycle and the latency is 5 or 6 cycles due to the extra conversion cycles and rounding cycle.

We determined that further new hexadecimal floating point instructions would assist the art and could be included in a z/Architecture machine and also emulated by others in simpler machines, as described herein. Improvements have been made to the Floating Point Unit itself.

BRIEF SUMMARY OF THE INVENTION

The next generation zSeries floating-point unit will include the preferred embodiments of our new fused hexadecimal floating point instructions MULTIPLY AND ADD and MULTIPLY AND SUBTRACT execute in the floating point unit with RRF and RXF formats. The improved floating point unit can be used with the HFP and BFP instructions described herein and so the system described herein is the first IBM mainframe with a fused multiply-add dataflow. It supports both S/390 hexadecimal floating-point architecture and the IEEE 754 binary floating-point architecture which was first implemented in S/390® on the 1998 S/390® G5 floating-point unit. The new floating-point unit supports a total of 6 formats including single, double, and quadword formats implemented in hardware. With the fused multiply-add dataflow the third operand is multiplied by the second operand, and then the first operand is added to or subtracted from the product. The ADD sum or SUBTRACT difference is placed at the first-operand location. The MULTIPLY AND ADD and MULTIPLY AND SUBTRACT operations may be summarized as:

op1=op3·op2±op1 (FIG. 11 1102)

Referring to FIG. 8 and FIG. 10, the third and second operands 804 are multiplied 805, forming an intermediate product, and the first operand 806 is then added 806 (or subtracted 807) algebraically to (or from) the intermediate product, forming an intermediate result. The exponent and fraction of the intermediate product and intermediate result are maintained exactly. The intermediate result, if non zero, is normalized 1001 and truncated 1001 to the operand format and then placed 808 at the first-operand location.

BRIEF DESCRIPTION OF THE SEVERAL VIEWS OF THE DRAWING

These and other objects will be apparent to one skilled in the art from the following detailed description of the invention taken in conjunction with the accompanying drawings in which:

FIG. 1 is a diagram of the Multiply and Add instruction in the RRF instruction format;

FIG. 2 is a diagram of the Multiply and Add instruction in the RXF instruction format;

FIG. 3 is a diagram of the Multiply and Subtract instruction in the RRF instruction format; and FIG. 4 is a diagram of the Multiply and Subtract instruction in the RXF format.

FIG. 10 depicts a method for forming a final result of the present invention.

DETAILED DESCRIPTION OF THE INVENTION

Figure 5:
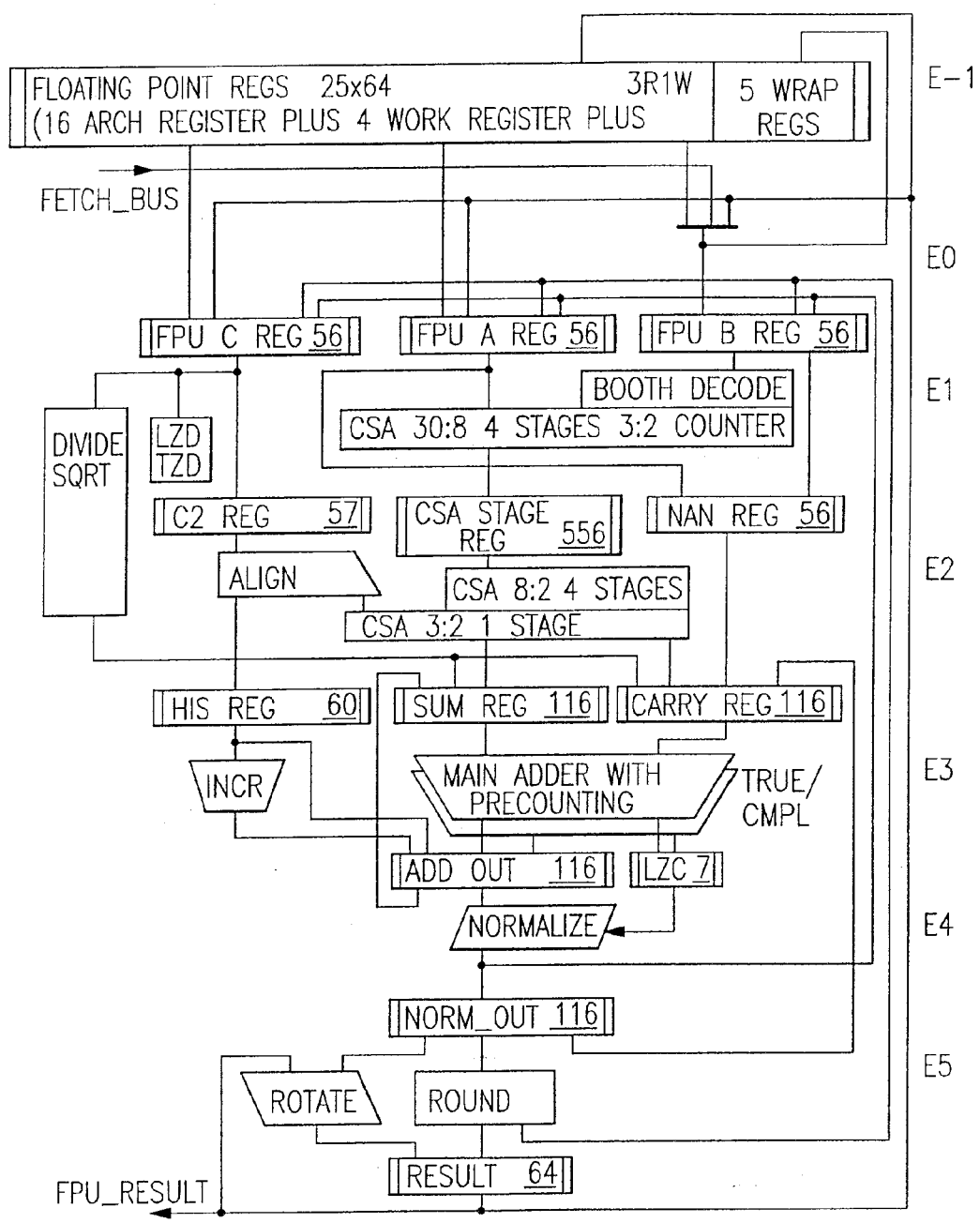
FIG. 5. Shows the main fraction dataflow of the Floating Point Unit (FPU) utilizing the Multiply and Add and Multiple and Subtract instructions in the RRF and RXF formats.

For an overview, we will describe a new zSeries floating-point unit has been shown which, for the first time, is based on a fused multiply-add dataflow capable of supporting two architectures and fused MULTIPLY and ADD and Multiply and SUBTRACT in both RRF and RXF formats for the fused functions. Both binary and hexadecimal floating-point instructions are supported for a total of 6 formats. The floating-point unit is capable of performing a multiply-add instruction for hexadecimal or binary every cycle with a latency of 5 cycles. This has been accomplished by a unique method of representing the two architectures with two internal formats with their own biases. This has eliminated format conversion cycles and has optimized the width of the dataflow. Though, this method creates complications in the alignment of the addend and product which have been shown in detail. Denormalized numbers are almost exclusively handled in the regular dataflow except for one case which is destined for an underflow exception handler anyway.

The new zSeries floating-point unit is optimized for both hexadecimal and binary floating-point architecture. It is versatile supporting 6 formats, and it is fast supporting a multiply-add per cycle.

In more detail, our new fused floating point instructions MULTIPLY AND ADD and MULTIPLY AND SUBTRACT execute in the floating point unit with RRF and RXF formats. The HFP instructions are illustrated in FIGS. 1, 2, 3 and 4. The improved floating point unit can be used with the HFP instructions described herein and so the system described herein is the first IBM mainframe with a fused multiply-add dataflow. It supports both S/390 hexadecimal floating-point architecture and the IEEE 754 binary floating-point architecture which was first implemented in S/390 on the 1998 S/390 G5 floating-point unit. The new floating-point unit supports a total of 6 formats including single, double, and quadword formats, as implemented in hardware in the representative IBM machines. With the fused multiply-add dataflow the third operand is multiplied by the second operand, and then the first operand is added to or subtracted from the product. The ADD sum or SUBTRACT difference is placed at the first-operand location. The MULTIPLY AND ADD and MULTIPLY AND SUBTRACT operations may be summarized as:

$$op1=op3 \cdot op2 \pm op1$$

Specifically, the new description of MULTIPLY AND ADD is illustrated by FIGS. 1 and 2 supporting op1=op3·op2+op1 FIG. 1 is a diagram of the Multiply and Add instruction in the RRF instruction format, and FIG. 2 is a diagram of the Multiply and Add instruction in the RXF instruction format.

The new description of MULTIPLY AND SUBTRACT is illustrated by FIGS. 3 and 4 supporting op1=op3·op2−op1.

FIG. 3 is a diagram of the Multiply and Subtract instruction in the RRF instruction format, and FIG. 4 is a diagram of the Multiply and Subtract instruction in the RXF format.

As we have stated, the third operand is multiplied by the second operand, and then the first operand is added to or subtracted from the product. The sum or difference is placed at the first-operand location. Both the MULTIPLY AND ADD and MULTIPLY AND SUBTRACT operations may be summarized as:

$$op1=op3 \cdot op2 \pm op1$$

The third and second operands are multiplied, forming an intermediate product, and the first operand is then added (or subtracted) algebraically to (or from) the intermediate product, forming an intermediate result. The exponent and fraction of the intermediate product and intermediate result are maintained exactly. The intermediate result, if non zero, is normalized and truncated to the operand format and then placed at the first-operand location.

The sign of the result is determined by the rules of algebra, unless the intermediate-result fraction is zero, in which case the result is made a positive true zero.

An HFP-exponent-overflow exception exists when the characteristic of the normalized result would exceed 127 and the fraction is not zero. The operation is completed by making the result characteristic 128 less than the correct value, and a program interruption for HFP exponent overflow occurs. The result is normalized, and the sign and fraction remain correct.

HFP exponent overflow is not recognized on intermediate values, provided the normalized result can be represented with the correct characteristic. An HFP-exponent-underflow exception exists when the characteristic of the normalized result would be less than zero and the fraction is not zero. If the HFP-exponent-underflow mask bit in the PSW is one, the operation is completed by making the result characteristic 128 greater than the correct value, and a program interruption for HFP exponent underflow occurs. The result is normalized, and the sign and fraction remain correct. If the HFP-exponent-underflow mask bit in the PSW is zero, a program interruption does not occur; instead, the operation is completed by making the result a positive true zero.

HFP exponent underflow is not recognized on input operands and intermediate values, provided the normalized result can be represented with the correct characteristic.

Condition Code: The code remains unchanged.

Program Exceptions:

Access (fetch, operand 2 of MAE, MAD, MSE, MSD)
Data with DXC 1, AFP register
HFP exponent overflow
HFP exponent underflow
Operation (if the multiply-add/subtract facility is not installed)

Programmers should note that fused HFP MULTIPLY AND ADD (SUBTRACT) differs from MULTIPLY followed by ADD (SUBTRACT) NORMALIZED in the following ways:

1. The product is maintained to full precision, and overflow and underflow are not recognized on the product.

2. The HFP-significance exception is not recognized for MULTIPLY AND ADD (SUBTRACT).

3. ADD (SUBTRACT) NORMALIZED maintains only a single guard digit and does not prenormalize input operands; thus, in some cases, an unnormalized input operand may cause loss of precision in the result. MULTIPLY AND ADD (SUBTRACT) maintains the entire intermediate sum (difference), which is normalized before the truncation operation is performed; thus, unnormalized operands do not cause any additional loss of precision.

4. On most models of our planned machines tested with the floating point unit described below, the execution time of MULTIPLY AND ADD (SUBTRACT) is less than the combined execution time of MULTIPLY followed by ADD (SUBTRACT) NORMALIZED. The performance of MULTIPLY AND ADD (SUBTRACT) may be severely degraded in the case of unnormalized input operands.

The new floating-point unit whose dataflow is illustrated by FIG. 5 supports a total of 6 formats including single, double, and quadword formats implemented in hardware. The floating-point pipeline is 5 cycles with a throughput of 1 multiply-add per cycle. Both hexadecimal and binary floating-point instructions are capable of this performance due to a novel way of handling both formats. Other key developments include new methods for handling denormalized numbers and quad precision divide engine dataflow.

Introduction to the Floating-Point Unit (FPU)

Figure 11:
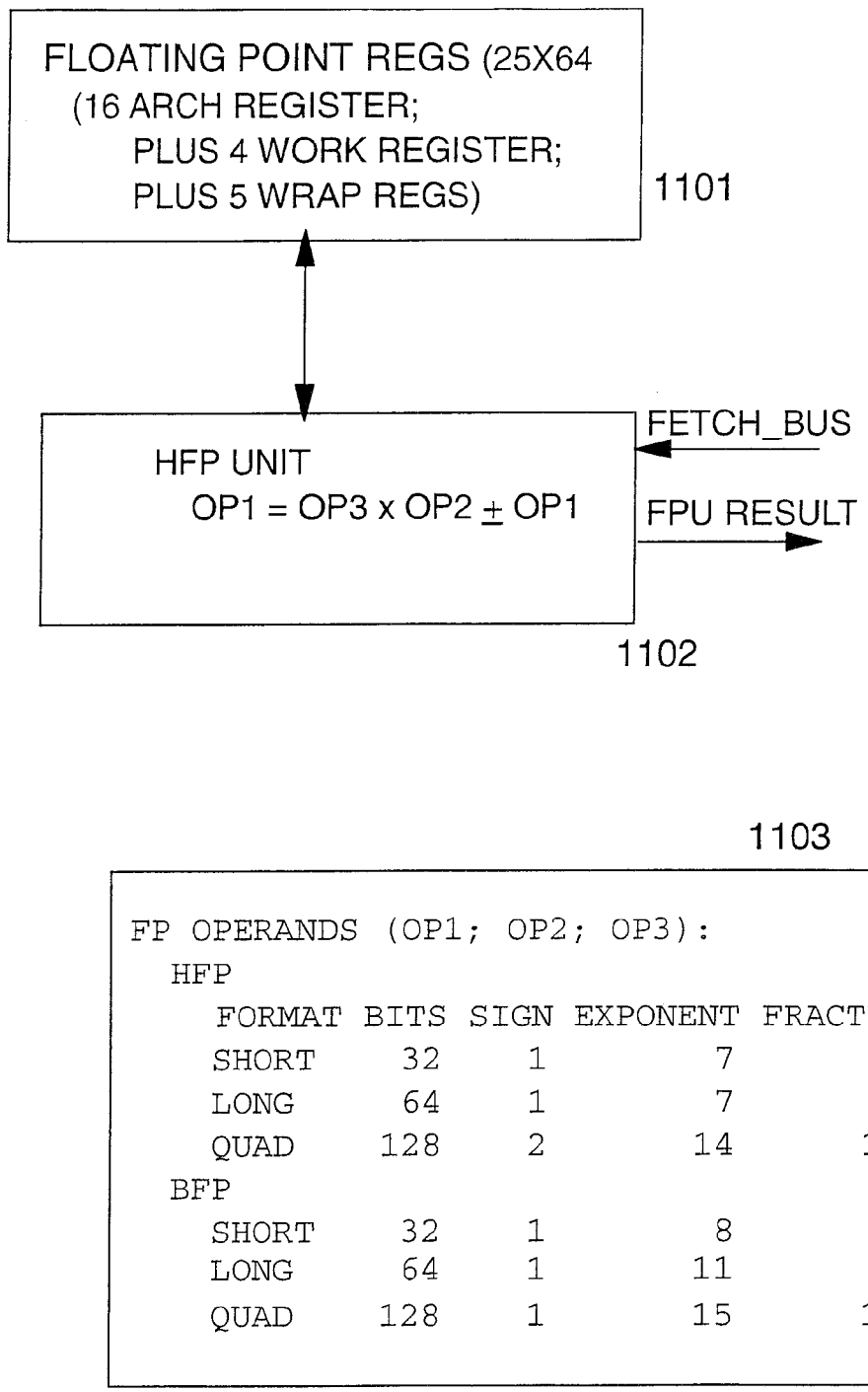
FIG. 11 depicts a operand formats of the present invention.

This future floating-point unit (FPU) of a high performance microprocessor which is optimized for commercial workloads. (n.b. For convenience of reference we have bracketed the footnotes which appear at the end of this description adjacent the relevant reference point.) The FPU implements two architectures: Binary Floating-Point (BFP) which is compliant with the IEEE 754 Standard [1], and Hexadecimal Floating-Point (HFP) as specified by IBM S/390 Architecture [2] which is now called z/Architecture [3]. There are a total of 6 formats supported which include single, double, and quad-word formats for the two architectures as shown in the following table and in FIG. 11 at 1103:

| Format | bits | sign | exponent | significand | bias |
|---|---|---|---|---|---|
| BFP short | 32 | 1 | 8 | 23 | 127 |
| BFP long | 64 | 1 | 11 | 52 | 1023 |
| BFP quad | 128 | 2 | 14 | 112 | 16383 |
| HFP short | 32 | 1 | 7 | 24 | 64 |
| HFP long | 64 | 1 | 7 | 56 | 64 |
| HFP quad | 128 | 1 | 7 | 112 | 64 |

Unlike many other processors, zSeries processors implement quad precision operations in hardware, and this includes support for both HFP and BFP architectures.

Prior IBM zSeries floating-point units which can be designated by the year and Generation (e.g. 1996 G4) have included the 1996 G3 FPU [4], the 1997 G4 FPU [5, 6], the 1998 G5 FPU [7, 8], the 1999 G6 FPU and the 2000 z900 FPU [9]. Most are remaps of the G5 FPU with extensions for 64-bit integers. The G4 FPU has an aggressive cycle time and can complete a multiply or add in about 3 cycles with a throughput of 1 per cycle. The G5 FPU is the first FPU to implement both BFP and HFP architectures in hardware on one pipeline. The G5 FPU design is based on the G4 FPU so it has the same latency for HFP instructions.

BFP instructions involve translating the operands to HFP format, performing the arithmetic operation including rounding and then converting back to BFP format. So, BFP operations take 5 or 6 cycles of latency with a throughput of only one BFP instruction every two cycles.

The prior IBM G5 FPU was designed with only one year between its announcement and that of the G4 FPU. So, the BFP arithmetic implementation is not optimized for speed, but instead for simplicity. With a longer development schedule for the next zSeries FPU, there were a few new goals: 1) optimize for BFP, 2) optimize for multiply-add, and then 3) optimize for HFP. The first goal was chosen due to the increase of new workloads on zSeries, particularly workloads utilizing Linux. These applications are typically written in Java or C++ and, especially those written in Java, rely on BFP even in commercial applications.

Thus, the primary goal was to create a high performance implementation much like the pSeries workstations.

One key element of pSeries floating-point units is that the dataflow supports our fused multiply-add described above which effectively yields two operations per cycle. Since this type of design is optimal for BFP architectures, a decision was made to base our design on the IBM Power4 design used in the commercial workstation of IBM.

The Power4 floating-point unit has a 6 stage binary multiply-add dataflow. It uses tags in the register file to identify denormalized data. It has only 2 data formats, BFP single and double with double format retained in the register file. The major enhancements of our new zSeries FPU to the Power4 design are:

1. Two architectures are supported (HFP and BFP) which results in 6 formats versus only 2 formats of BFP, and 200 different instructions are implemented directly in hardware.
2. The pipeline is reduced to 5 cycles.
3. Denormalized number handling is supported without tags or prenormalization.
4. The normalizer and LZA are expanded to full width.
5. Division and square root are implemented with a quad precision radix-4 SRT algorithm.

These items will be detailed hereinbelow. First, implementing two architectures in one dataflow will be discussed. Then, the overall dataflow will be described Dual Architectures The first machine to implement both BFP and HFP architectures in hardware is the 1998 IBM S/390 G5 Processor [7]. A hexadecimal dataflow is used which requires binary operands to be converted to hexadecimal operands before they are operated on. The HFP instructions are capable of performing one add or one multiply per cycle with a latency of about 3 cycles. The BFP instructions can only be pipelined one instruction every other cycle and the latency is 5 or 6 cycles due to the extra conversion cycles and rounding cycle.

The problem with optimizing the dataflow for both HFP and BFP architectures centers on the choice of an internal bias. HFP architecture has a bias of the form $2n-1$ whereas BFP has a bias of the form $(2n-1-1)$. To choose one of the biases as the internal bias and to convert to format requires shifting the significands and adding constants to the exponent. To avoid a conversion cycle, a separate internal representation and bias was chosen for both architectures as shown by the following:

$$XBF\ Pi=(-1)Xs*(1+Xf)*2**(e-biasBi)$$

$$biasBi=2**(n-1)-1=32767$$

$$XHF\ Pi=(-1)Xs*Xf*2**(e-biasHi)$$

$$biasHi=2**(n-1)=32768$$

This results in no conversion cycles and the dataflow is optimized for both architectures. This requires two different shift amount calculations since the biases differ and the implied radix points differ, but this is a very small amount of hardware.

Floating Point Dataflow Overview

FIG. 5 shows the fraction dataflow. At the top of the figure there is the Floating-Point Register file (FPR) with 16 registers of 64 bits each. There are also 5 wrap registers to hold data for loads.

FIG. 5. shows Main Fraction Dataflow of FPU. Loads are staged through the 5 wrap registers and the dataflow. Loads can be bypassed from any stage in the pipeline to a dependent instruction by using the wrap registers. This eliminates wiring congestion in the FPU dataflow stack and instead localizes it to the register file. When a read of an operand occurs, the data can come from the architected register file (FIG. 5 and FIG. 11 1101), the wrap registers, or a wrap back path from the dataflow (FIG. 5 and FIG. 11 1102), or from memory. In one cycle three registers of 64 bits can be read and one register can be written.

The dataflow is a three operand dataflow (FIG. 5 and FIG. 11 1102), which has a fused multiply and add data structure. One multiplier operand and the addend always come from the FPRs, while the 2nd operand may come from memory. In the starting cycle (labeled E0), the A, B and C registers are loaded with the correct formatting applied, such as zeroing the low order bits of a short precision operand. For binary formats the 'implied one' bit is assumed to be always '1'. If a denormalized number is detected afterwards, this is corrected in the multiplier and/or the aligner logic.

In the first execution cycle (E1), the shift amount for the alignment is calculated (considering potential de-normalized operand cases). Also, the multiplication is started with Booth encoding and the first 4 stages of 3:2 counters of the Wallace tree. If there is an effective subtraction, the addend is stored inverted in the C2 register.

In the second execution cycle (E2), the alignment uses the previous calculated shift amount. In the multiplier, the next 4 stages of 3:2 counters reduce the tree to two partial products. These partial products with the aligned addend go through the last 3:2 counter to build the 'sum' and 'carry' of the multiply and add result. To balance the paths for the timing, the propagate and generate logic is performed also in this cycle. The propagate and generate bits are stored in a register instead of the sum and carry bits. A potential high part of the aligner output is stored in the high-sum register (HIS reg).

In the third execution cycle (E3), the main addition takes place. There is a 'True' and a 'Complement' Adder to avoid an extra cycle for recomplementation. Essentially, both A−B and B−A are calculated and the result is selected based on the carry output of the true adder. The number of leading zero bits is calculated using a zero digit count (ZDC) as described in [4]. This algorithm performs a zero digit count on 16 bit block basis of SUM and SUM+1. When the carries are known the result is selected among the digits. The aligner bits which did not participate in the add are called the high-sum and they feed an incrementer in this cycle. At the end of this cycle there is a multiplexor which chooses between high-sum and high-sum plus one and also chooses whether to shift the result by 60 bits. If the high-sum is non-zero, the high-sum and upper 56 bits of the adder output are chosen to be latched. If instead the high-sum is zero, only the bits of the adder output are latched. Also the leading zero count is stored in the LZC register.

In the fourth execution cycle (E4), the normalization is done. The stored leading zero count is used directly to do the normalization. No correction is necessary, since the LZC is precise. For hex formats, only the two low order bits of the leading zero count are not used to get the normalized hex result. Additionally, the sticky bits are built according to the format.

In the fifth execution cycle (E5), the rounding and reformatting is done. For hex operands no rounding is needed, but the operands will pass this cycle anyway. Since there is a feedback path from the normalizer to the A, B, and C registers, Physical Implementation The fraction dataflow has been implemented in a bit stack approach in the folded form layout of FIG. 6. The A, B and C registers have a width of 56 bits. This is widened during alignment and multiplication. The adder, normalizer, and rounder are 116 bits wide. The output of the rounder is reformatted to a width of 64 (with exponent). The layout has a folded form.

Figure 6:
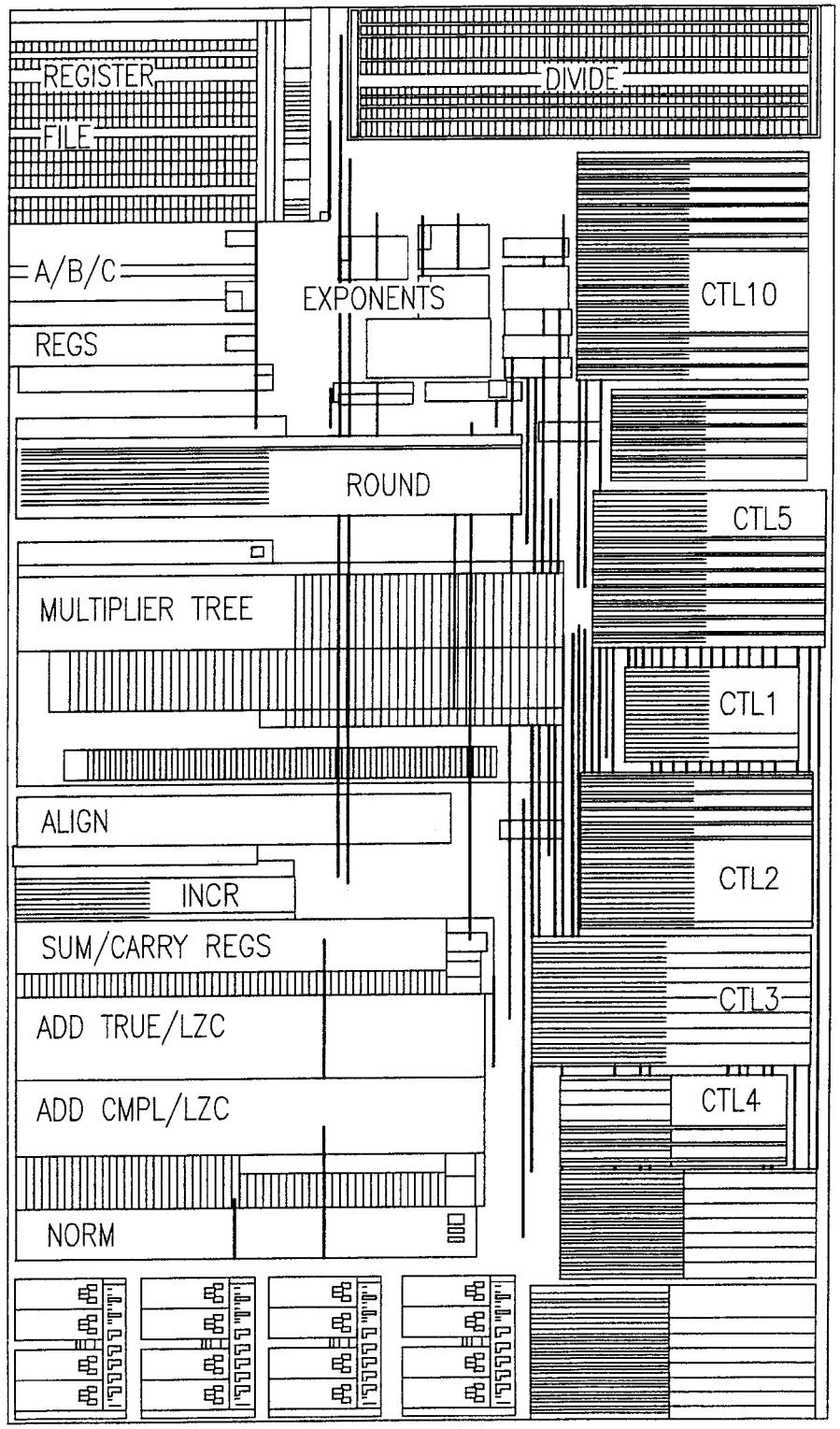
FIG. 6 shows the folded form layout of the FPU.

On the top of FIG. 6 are the architectural floating-point registers with A, B, and C registers below. On the bottom is the normalizer. The exponent dataflow is in a stack on the right of the A, B, and C fraction registers.

The divider is also implemented in a stack approach, whereby the divide-table is combinatorial logic which occupies a very small area on the left hand side of the divider macro. Since the interconnection of the divide engine to the main fraction dataflow is not timing critical, this can be located away from the main dataflow and is shown in the right upper corner of the layout. The fraction dataflow is on the left hand side. On the right are the synthesized control logic macros. For each execution pipeline there is one separate control macro. The macros on the bottom contain some miscellaneous logic, which is not related to the floating-point function.

The divider macro is completely designed in standard inverting CMOS logic. Although it has been implemented as a full custom macro, extensive use of a standard cell library has been made in order to keep layout effort small.

As a power saving feature, most parts of the floating-point unit can be turned off completely when not in use. For enhanced testability, each of the master-slave latches is accompanied by an additional scan latch. Adding this extra scan latch to the scan chain configuration results in an increased transition fault coverage. The floating-point unit occupies an area of 3.76 mm2. The divider macro occupies 0.22 mm2, which is about 6% of the FPU. It has been fabricated in IBM's 0.13 micron CMOS SOI technology. At a supply voltage of 1.15V and a temperature of 50° C. it supports a clock frequency significantly greater than 1 Ghz.

Emulation Execution

Figure 7:
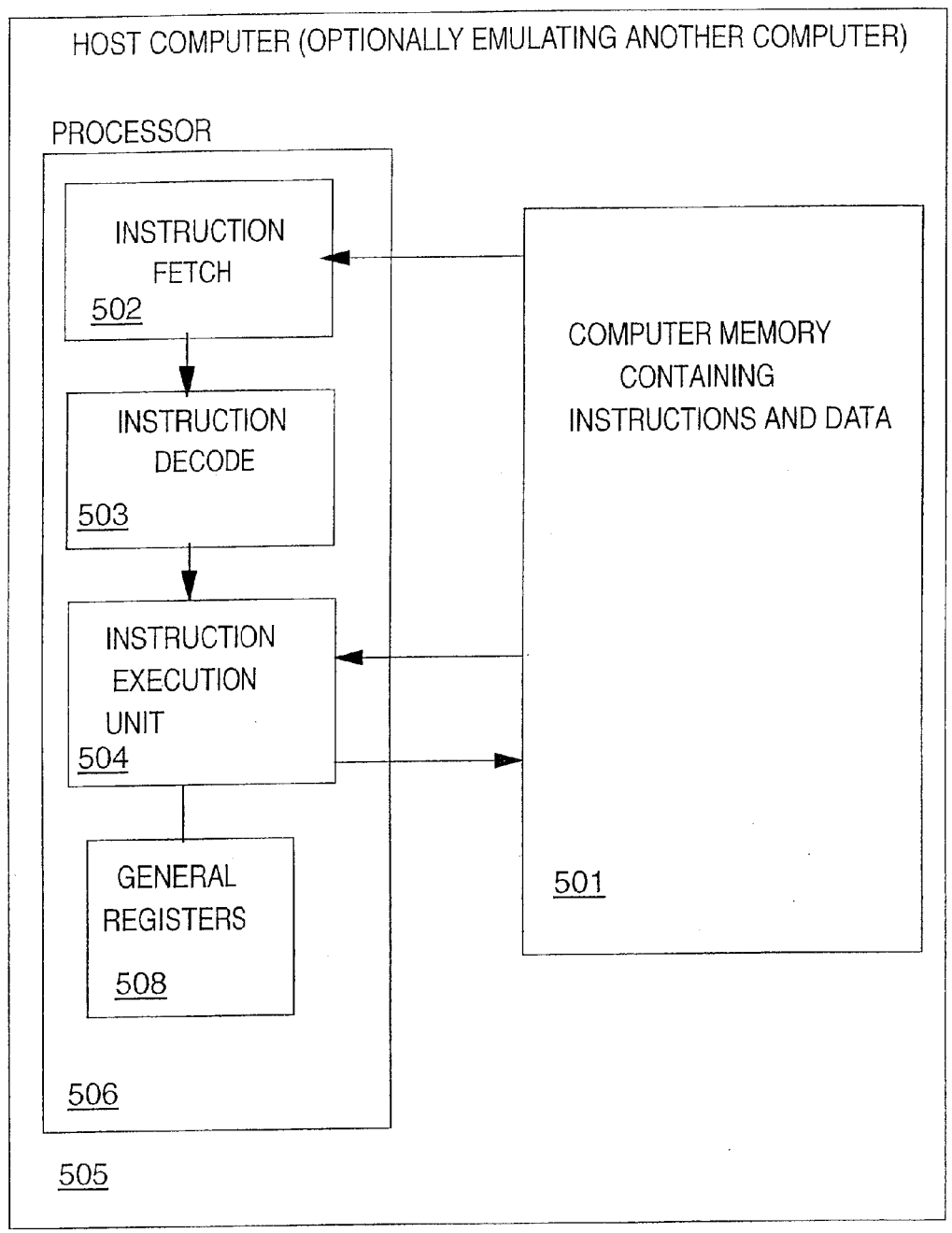
FIG. 7 illustrates a computer enabling emulation of the Multiply and Add and Multiply and Subtract instructions.
Figure 8:
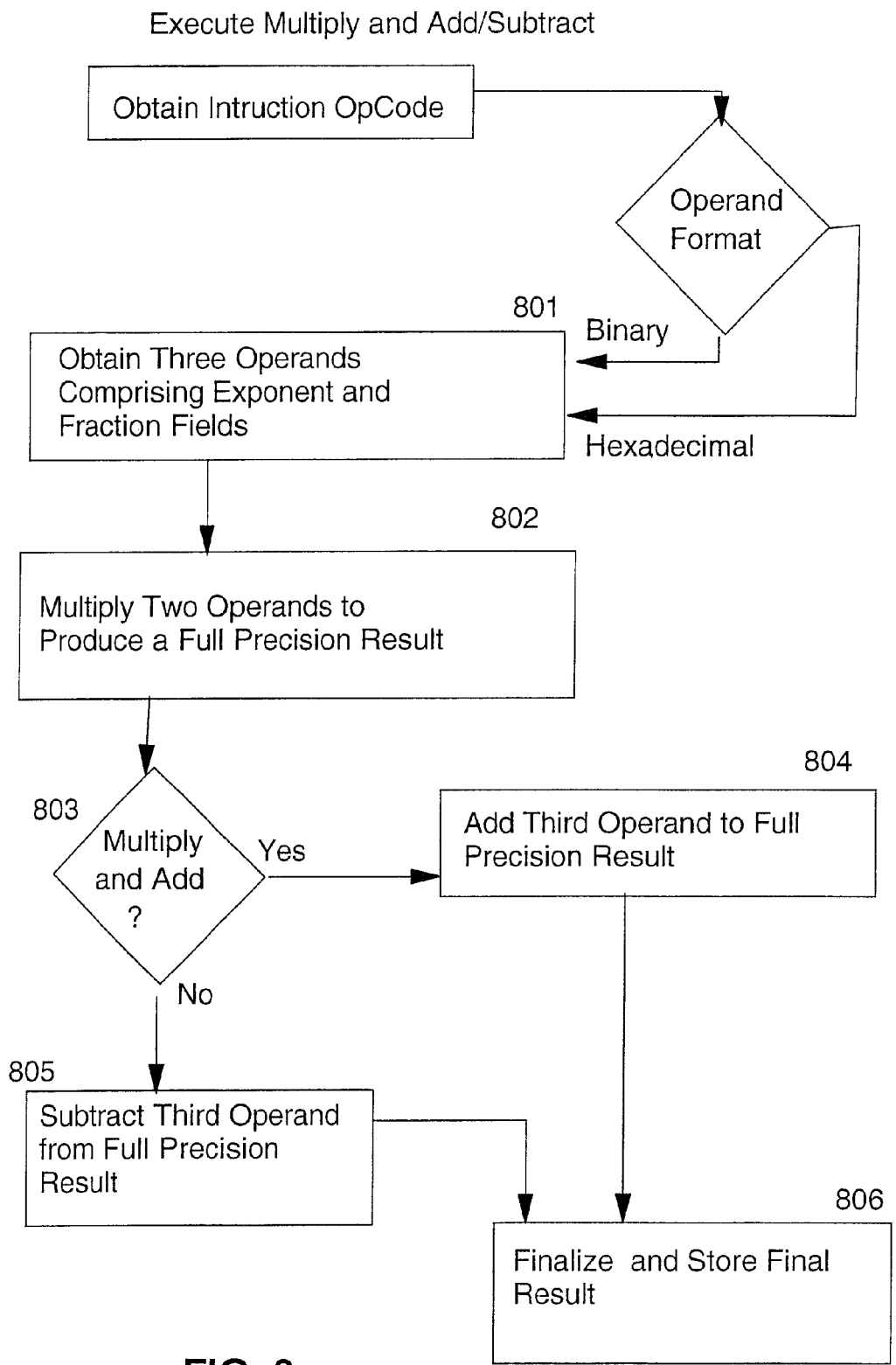
FIG. 8 depicts a method for performing steps of the present invention.
Figure 9:
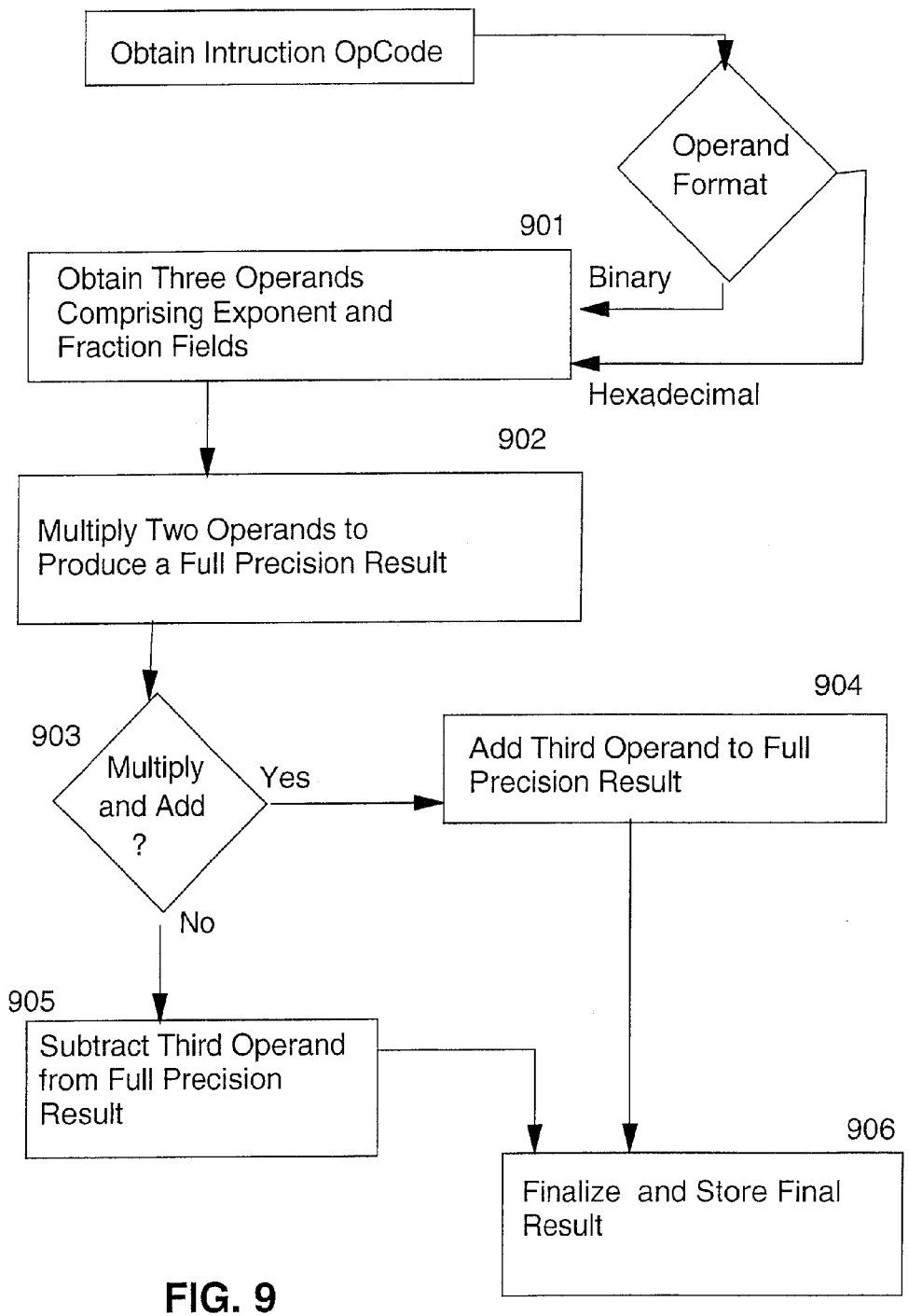
FIG. 9 depicts an emulator method for performing steps of the present invention.

The machine which we prefer to use with our floating point unit is the z/Architecture computer system having a FXU unit as described in copending application "Superscalar Microprocessor having Multi-pipe Dispatch and Execution Unit", U.S. application Ser. No. 10/435,806, by Timothy Slegel et al. In FIG. 7 we have shown conceptually how to implement what we have in a preferred embodiment implemented in a mainframe computer 505 having the microprocessor described above which can effectively be used, as we have experimentally proven within IBM, in a commercial implementation. These instruction formats stored in the storage medium may be executed natively in a Z/Architecture IBM Server, or alternatively in machines executing other architectures. They can be emulated in the existing and in future IBM mainframe servers and on other machines of IBM (e.g. pSeries Servers and xSeries Servers). They can be executed in machines running Linux on a wide variety of machines using hardware manufactured by IBM, Intel®, AMD®, Sun Microsystems® and others. Besides execution on that hardware under a Z/Architecture, Linux can be used as well as machines which use emulation by Hercules, UMX, FSI® or Platform Solutions Inc.®, where generally execution is in an emulation mode. In emulation mode the specific instruction being emulated is decoded, and a subroutine built (illustrated by FIG. 9) to implement the individual instruction, as in a "C" subroutine or driver, or some other method of providing a driver for the specific hardware as is within the skill of those in the art after understanding the description of the preferred embodiment. Various software and hardware emulation patents including, but not limited to U.S. Pat. No. 5,551,013 for a "Multiprocessor for hardware emulation" of Beausoleil et al., and U.S. Pat. No. 6,009,261: Preprocessing of stored target routines for emulating incompatible instructions on a target processor" of Scalzi et al; and U.S. Pat. No. 5,574,873: Decoding guest instruction to directly access emulation routines that emulate the guest instructions, of Davidian et al; U.S. Pat. No. 6,308,255: Symmetrical multiprocessing bus and chipset used for coprocessor support allowing non-native code to run in a system, of Gorishek et al; and U.S. Pat. No. 6,463,582: Dynamic optimizing object code translator for architecture emulation and dynamic optimizing object code translation method of Lethin et al; and U.S. Pat. No. 5,790,825: Method for emulating guest instructions on a host computer through dynamic recompilation of host instructions of Eric Traut; and many others, illustrate the a variety of known ways to achieve emulation of an instruction format architected for a different machine for a target machine available to those skilled in the art, as well as those commercial software techniques used by those referenced above.

As illustrated by FIG. 7, these instructions are executed (for example) in hardware by a processor or by emulation of said instruction set by software executing on a computer having a different native instruction set.

In FIG. 7, 501 shows a computer memory storage containing instructions and data. The instructions described in this embodiment would initially stored in this computer. 502 shows a mechanism for fetching instructions from a computer memory 501 and may also contain local buffering of these instructions it has fetched. Then the raw instructions are transferred to an instruction decoder, 503, where it determines what type of instruction has been fetched. 504 and FOG/8 show a mechanism for executing instructions. This may include loading data into a register 508 from memory 501, storing data back to memory from a register 508, or performing some type of arithmetic or logical operation. This exact type of operation to be performed has been previously determined by the instruction decoder. The instructions described in this embodiment would be executed here. If the instructions are being executed natively on a computer system, then this diagram is complete as described above. However, if an instruction set architecture, is being emulated on another computer, the above process would be implemented in software on a host computer, #505. In this case, the above stated mechanisms would typically be implemented as one or more software subroutines within the emulator software. In both cases an instruction is fetched, decoded and executed.

More particularly, these architected instructions can be used with a computer architecture with existing instruction formats with a 12 bit unsigned displacement used to form the operand storage address and also one having additional instruction formats that provide a additional displacement bits, preferably 20 bits, which comprise an extended signed displacement used to form the operand storage address. These computer architected instructions comprise computer software, stored in a computer storage medium, for producing the code running of the processor utilizing the computer software, and comprising the instruction code for use by a compiler or emulator/interpreter which is stored in a computer storage medium 501, and wherein the first part of the instruction code comprises an operation code which specified the operation to be performed and a second part which designates the operands for that participate.

As illustrated by FIGS. 7-10, these instructions may be executed in hardware by a processor or by emulation of said instruction set by software executing on a computer having a different native instruction set.

Furthermore, the preferred computer architecture has an instruction format such that the opcode is in bit positions 0 through 15.

While the preferred embodiment of the invention has been illustrated and described herein, it is to be understood that the invention is not limited to the precise construction herein disclosed, and the right is reserved to all changes and modifications coming within the scope of the invention as defined in the appended claims.

REFERENCED FOOTNOTES

[1] "IEEE standard for binary floating-point arithmetic, ANSI/IEEE Std 754-1985," The Institute of Electrical and Electronic Engineers, Inc., New York, August 1985.

[2] "Enterprise Systems Architecture/390 Principles of Operation," Order No. SA22-7201-7, available through IBM branch offices, July 2001.

[3] "z/Architecture Principles of Operation," Order No. SA22-7832-1, available through IBM branch offices, October 2001.

[4] G. Gerwig and M. Kroener. "Floating-Point-Unit in standard cell design with 116 bit wide dataflow," In Proc. Of Fourteenth Symp. on Comput. Arith., pages 266-273, Adelaide, Austraila, April 1999.

[5] E. M. Schwarz, L. Sigal, and T. McPherson. "CMOS floating point unit for the S/390 parallel enterpise server G4," IBM Journal of Research and Development, 41(4/5): 475-488, July/September 1997.

[6] E. M. Schwarz, B. Averill, and L. Sigal. "A radix-8 CMOS S/390 multiplier," In Proc. of Thirteenth Symp. On Comput. Arith., pages 2-9, Asilomar, Calif., July 1997.

[7] E. M. Schwarz and C. A. Krygowski. "The S/390 G5 floating-point unit," IBM Journal of Research and Development, 43(5/6):707-722, September/November 1999.

[8] E. Schwarz, R. Smith, and C. Krygowski. "The S/390 G5 floating point unit supporting hex and binary architectures," In Proc. of Fourteenth Symp. on Comput. Arith., pages 258-265, Adelaide, Austraila, April 1999.

[9] E. M. Schwarz, M. A. Check, C. Shum, T. Koehler, S. Swaney, J. MacDougall, and C. A. Krygowski. "The microarchi-tecture of the IBM eServer z900 processor," IBM Journal of Research and Development, 46(4/5):381-396, July/September 2002.

[10] C. A. Krygowski and E. M. Schwarz. "Floating-point multiplier for de-normalized inputs," U.S. Patent Application No. 2002/0124037 A1, page 8, Sep. 5, 2002.

[11] J. E. Robertson. "A new class of digital division methods," IEEE Trans. Comput., C-7:218-222, September 1958.

[12] K. D. Tocher. "Techniques of multiplication and division for automatic binary computers," Quarterly J. Mech. Appl. Math., 11:364-384, 1958.

[13] M. Ercegovac and T. Lang. Division and Square Root: digit-recurrence algorithms and implementations, Kluwer, Boston, 1994.

[14] D. I. Harris, S. F. Obermann, and M. A. Horowitz. "SRT Division Architectures and Implementations," In Proc. Of Thirteenth Symp. on Comput. Arith., pages 18-25, Asilomar, Calif., July 1997.

What is claimed is:

1. A computer system supporting both Binary Floating Point (BFP) operations and non-BFP floating point operations, wherein the non-BFP floating point operations comprise Hexadecimal Floating Point (HFP) operations, the computer system comprising:

computer memory;

a processor in communications with the computer memory the processor comprising an instruction fetching element for fetching instructions from memory of a first computer architecture and executed by the processor of an alternate computer architecture and one or more execution elements for interpreting the fetched instructions to identify a predetermined software subroutine for emulating the operation of the fetched instructions, the predetermined software subroutine comprising a plurality of instructions; and executing the predetermined software subroutine to perform a method comprising:

providing three operands of a combination multiply add/subtract instruction to a main fraction dataflow element of a floating point element, each of said operands comprising BFP floating point format values or non-BFP floating point format values, said non-BFP floating point format values comprising floating point format values other than Binary Floating Point (BFP) format values, and said main fraction dataflow element configured to process both BFP floating point format values and non-BFP floating point format values for said operands;

responsive to the combined multiply add/subtract instruction being a non-BFP floating point multiply add/subtract instruction, the main fraction dataflow element performing a non-BFP floating point operation on the provided three operands to produce a non-BFP main fraction result, said operands comprising said non-BFP floating point format values, the operation specified by the combination multiply add/subtract instruction, the non-BFP main fraction result comprising non-BFP floating point format fraction values; and responsive to the combined multiply add/subtract instruction being a non-BFP multiply add/subtract instruction, storing the non-BFP main fraction result; and responsive to the combined multiply add/subtract instruction being a BFP multiply add/subtract instruction, the main fraction dataflow element performing a BFP operation on the provided three operands to produce a BFP main fraction result, said operands comprising said BFP floating point format values, the operation specified by the combination multiply add/subtract instruction, the BFP main fraction result comprising BFP format fraction values; and responsive to the combined multiply add/subtract instruction being a BFP multiply add/subtract instruction, storing the BFP main fraction result.

2. The computer system of claim 1, wherein the BFP floating point format values or non-BFP floating point format values consist of any one of a single word, a double word, or a quad word.

3. The computer system of claim 1, wherein the combination multiply add/subtract instruction is a Multiply and Add instruction further comprising: the main fraction dataflow operation performed comprises adding a fraction value of an operand of the three operands to a multiplication product fraction value of fraction values of two operands of the three operands to produce the main fraction result.

4. The computer system of claim 1, wherein the combination multiply add/subtract instruction is a Multiply and Subtract instruction wherein the main fraction dataflow operation performed comprises subtracting a fraction value of an operand of the three operands from a multiplication product fraction value of fraction values of two operands of the three operands.

5. The computer system of claim 3, wherein the main fraction dataflow operation performed further comprises:
based on the fraction values of two operands of the three operands, producing a full precision intermediate fraction result; and
using the full precision intermediate result to produce the main fraction result.

6. The computer system of claim 4, wherein the main fraction dataflow operation performed further comprises:
based on the fraction values of two operands of the three operands, producing a full precision intermediate fraction result; and
using the full precision intermediate result to produce the main fraction result.

7. The computer system of claim 1, further comprising:
responsive to the combination multiply and add/subtract instruction being an HFP format instruction, multiplying fraction values of two operands of the three operands to produce an intermediate product result having either an overflow or underflow without recognizing the overflow or underflow;

responsive to the combination multiply add/subtract instruction being an HFP format Multiply and Add instruction adding a fraction value of an operand of the three operands to a multiplication product fraction value of fraction values of two operands of the three operands to produce an intermediate product result; and responsive to the combination multiply add/subtract instruction being an HFP format Multiply and Subtract instruction subtracting a fraction value of an operand of the three operands from a multiplication product fraction value of fraction values of two operands of the three operands to produce an intermediate product result.

8. The computer system of claim 1, wherein an HFP-significance exception is not recognized.

9. The computer system of claim 1, wherein the combination multiply and add/subtract instruction is an instruction of an architecture to be emulated by a native processor of a different architecture further comprising interpreting the combination multiply and add/subtract instruction to identify a predetermined software routine comprising instructions of the different architecture for emulating the operation of the main fraction dataflow element; and
wherein the process for performing combinations of multiply, add, and subtract operations is performed by the predetermined software.

10. A computer program product for performing combinations of multiply, add, and subtract operations in an environment supporting both Binary Floating Point (BFP) operations and non-BFP floating point operations, wherein the non-BFP floating point operations comprise Hexadecimal Floating Point (HFP) operations, the computer program product comprising:
a non-transitory storage medium readable by a processor storing instructions for execution by the processor and the processor comprising an instruction fetching element for fetching instructions from memory of a first computer architecture and executed by the processor of an alternate computer architecture and one or more execution elements for interpreting the fetched instructions to identify a predetermined software subroutine for emulating the operation of the fetched instructions, the predetermined software subroutine comprising a plurality of instructions; and executing the predetermined software subroutine:
providing three operands of a combination multiply add/subtract instruction to a main fraction dataflow element of a floating point element, each of said operands comprising BFP floating point format values or non-BFP floating point format values, said non-BFP floating point format values comprising floating point format values other than Binary Floating Point (BFP) format values, and said main fraction dataflow element configured to process both BFP floating point format values and non-BFP floating point format values for said operands;
responsive to the combined multiply add/subtract instruction being a non-BFP floating point multiply add/subtract instruction, the main fraction dataflow element performing a non-BFP floating point operation on the provided three operands to produce a non-BFP main fraction result, said operands comprising said non-BFP floating point format values, the operation specified by the combination multiply add/subtract instruction, the non-BFP main fraction result comprising non-BFP floating point format fraction values; and
responsive to the combined multiply add/subtract instruction being a non-BFP multiply add/subtract instruction, storing the non-BFP main fraction result; and responsive to the combined multiply add/subtract instruction being a BFP multiply add/subtract instruction, the main fraction dataflow element performing a BFP operation on the provided three operands to produce a BFP main fraction result, said operands comprising said BFP floating point format values, the operation specified by the combination multiply add/subtract instruction, the BFP main fraction result comprising BFP format fraction values; and responsive to the combined multiply add/subtract instruction being a BFP multiply add/subtract instruction, storing the BFP main fraction result.

11. The computer program product of claim 10, wherein the BFP floating point format values or non-BFP floating point format values consist of any one of a single word, a double word, or a quad word.

12. The computer program product of claim 10, wherein the combination multiply add/subtract instruction is a Multiply and Add instruction wherein the main fraction dataflow operation performed comprises adding a fraction value of an operand of the three operands to a multiplication product fraction value of fraction values of two operands of the three operands to produce the main fraction result.

13. The computer program product of claim 10, wherein the combination multiply add/subtract instruction is a Multiply and Subtract instruction further comprising:

the main fraction dataflow operation performed comprises subtracting a fraction value of an operand of the three operands from a multiplication product fraction value of fraction values of two operands of the three operands.

14. The computer program product of claim 12, wherein the main fraction dataflow operation performed further comprises:

based on the fraction values of two operands of the three operands, producing a full precision intermediate fraction result; and using the full precision intermediate result to produce the main fraction result.

15. The computer program product of claim 13, wherein the main fraction dataflow operation performed further comprises:

based on the fraction values two operands of the three operands, producing a full precision intermediate fraction result; and using the full precision intermediate result to produce the main fraction result.

16. The computer program product of claim 10 further comprising:

responsive to the combination multiply and add/subtract instruction being an HFP format instruction, multiplying the fraction values of two operands of the three operands to produce an intermediate product result having either an overflow or underflow without recognizing the overflow or underflow; responsive to the combination multiply add/subtract instruction being an HFP format Multiply and Add instruction adding a fraction value of an operand of the three operands to a multiplication product fraction value of fraction values of two operands of the three operands to produce an intermediate product result; and responsive to the combination multiply add/subtract instruction being an HFP format Multiply and Subtract instruction subtracting a fraction value of an operand of the three operands from a multiplication product fraction value of fraction values of two operands of the three operands to produce an intermediate product result.

17. The computer program product of claim 10, wherein an HFP-significance exception is not recognized.

18. The computer program product of claim 10, wherein the combination multiply and add/subtract instruction is an instruction of an architecture to be emulated by a native processor of a different architecture further comprising interpreting the combination multiply and add/subtract instruction to identify a predetermined software routine comprising instructions of the different architecture for emulating the operation of the main fraction dataflow element; and wherein the process for performing combinations of multiply, add, and subtract operations is performed by the predetermined software.

19. A method for executing a hexadecimal floating point instruction in a computer system, the computer system comprising a plurality of general registers, and a general purpose processor in communications with a computer memory, the processor comprising one or more execution units, the execution units executing instructions fetched from the computer memory, the method comprising the steps of:

(a) fetching a hexadecimal floating point instruction from the computer memory of a first computer architecture and executed by the general purpose processor of an alternate computer architecture and one or more execution elements for interpreting the fetched instructions to identify a predetermined software subroutine for emulating the operation of the fetched instructions, the predetermined software subroutine comprising a plurality of instructions;

(b) responsive to fetching the hexadecimal floating point instruction, determining that the hexadecimal floating point instruction is either a multiply and add instruction or a multiply and subtract operation; and (c) responsive to the determining step, (1) fetching a first operand comprising a first exponent value and a first fraction (significand) value and a second operand comprising a second exponent value and a second fraction (significand) value;

(2) multiplying the first fraction value and second fraction value to produce a full precision result;

(3) fetching a third operand comprising a third exponent and a third fraction value;

(4a) when the hexadecimal floating point instruction is a multiply and add instruction, adding the third operand to the full precision result to produce a second result;

(4b) when the hexadecimal floating point instruction is a multiply and subtract instruction, subtracting the third operand from the full precision first, result to produce a second result;

(5) deriving a fourth fraction value from the second result; and (6) storing a result operand, the result operand comprising the fourth fraction.

20. The method according to claim 19 wherein each of the first fraction value, the second fraction value and the third fraction value consists of any one of 56 bits or 112 bits, wherein each of the first exponent value, the second exponent value and the third exponent value consists of 7 bits.

* * * * *